(12) United States Patent
Olivieri et al.

(10) Patent No.: US 8,243,832 B1
(45) Date of Patent: Aug. 14, 2012

(54) ENCODED SPACE TIME WARPED ASYMMETRICAL SIGNALING

(75) Inventors: Marc Pierre Olivieri, Marlton, NJ (US); Gregory Wayne Barnett, Merchantville, NJ (US); Randall Charles Poe, Rutledge, PA (US); Jon Carmelo Russo, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1170 days.

(21) Appl. No.: 11/955,585

(22) Filed: Dec. 13, 2007

(51) Int. Cl.
*H04L 27/00* (2006.01)

(52) U.S. Cl. ........ 375/259; 375/130; 375/135; 375/260; 375/295; 375/316; 342/159; 342/173

(58) Field of Classification Search .......... 375/135–136, 375/146–147, 223, 256, 259, 271, 295, 300, 375/301, 316, 322, 324, 340
See application file for complete search history.

(56) References Cited

U.S. PATENT DOCUMENTS

| | | | |
|---|---|---|---|
| 4,060,809 A | | 11/1977 | Baghdady |
| 6,968,022 B1 * | | 11/2005 | Poor et al. ............ 375/346 |
| 7,375,676 B1 * | | 5/2008 | Loberger ............ 342/160 |
| 7,956,809 B2 * | | 6/2011 | Haas et al. ............ 342/461 |
| 8,049,661 B1 * | | 11/2011 | Loberger ............ 342/173 |
| 2007/0058738 A1 * | | 3/2007 | Mahadevappa et al. ...... 375/260 |
| 2008/0084351 A1 * | | 4/2008 | Englert et al. ............ 342/418 |
| 2008/0317277 A1 * | | 12/2008 | Herrick ............ 382/100 |
| 2009/0066562 A1 * | | 3/2009 | Altes ............ 342/25 F |
| 2009/0129204 A1 * | | 5/2009 | Zhou et al. ............ 367/134 |
| 2009/0201982 A1 * | | 8/2009 | Dress et al. ............ 375/238 |

OTHER PUBLICATIONS

Baghdady, Elie J., "Theory of Frequency Modulation by Synthetic Antenna Motion", IEEE Transactions on Communications, vol. 39, No. 2, pp. 235-248, Feb. 1991.

Tarokh, et al., "Space-Time Codes for High Data Rate Wireless Communication: Performance Criterion and Code Construction", IEEE Transactions on Information Theory, vol. 44, No. 2, pp. 744-765, Mar. 1998.

Tarokh, et al., "Space-Time Block Coding for Wireless Communications: Performance Results", IEEE Journal on Selected Areas in Communication, vol. 17, No. 3, pp. 451-460, Mar. 1999.

* cited by examiner

*Primary Examiner* — Hirdepal Singh
(74) *Attorney, Agent, or Firm* — Howard IP Law Group, P.C.

(57) ABSTRACT

Space-time coding is applied to a wave transmitter, receiver, or both. In general, the space-time coding is performed by real or synthetic motion of the transmitter or receiver, with the location of energy radiation/reception varying over the symbol duration with at least one occurrence during the symbol duration of a minimum instantaneous speed greater than a quarter of the ratio of the smallest wavelength of the waves divided by the symbol duration, and with coded acceleration of the modification of location to modify the velocity over the symbol duration.

21 Claims, 18 Drawing Sheets

ENCODED SPACE TIME WARPED ASYMMETRICAL SIGNALING

FIELD OF THE INVENTION

This invention relates to communication, sensing, andor navigation (direction finding) by means of electromagnetic signals transmitted from a source in coded relative motion with a receiver.

BACKGROUND OF THE INVENTION

When signaling between two points using a physical aperture on transmit, the physical aperture provides directivity, which can be advantageous in that it increases the signal strength in the preferred direction by comparison with non-preferred directions. Non-preferred directions are subject to an actual loss of signal strength relative to an isotropic (omnidirectional or nondirectional) source.

It would be desirable to be able to process signals to provide signal strength (directivity) improvement similar to that of a directional antenna, but simultaneously at all transducing (transmitting or receiving) locations.

SUMMARY OF THE INVENTION

A method according to an aspect of the invention is for transmitting wave energy. The wave energy propagates in the medium at a speed C. The method comprises the step of generating information which defines symbols having finite durations and normalized information entropy within the range of zero to one. As an alternative, the step of generating information may define symbols of selected duration and of bandwidth larger than the inverse of the symbol duration. The information may include information symbols or pulses. The method further includes the step of moving an antenna in a predetermined spatial pattern as a function of time while transmitting the information signals. The motion modifies the location of the energy radiation along a coded path in space, resulting in apparent asymmetric time warping of the radiated energy in waves, which time warping is dependent on direction in space. The modification of location of the energy radiation varies over the symbol duration, with at least one occurrence during the symbol duration of a instantaneous speed greater than C/200. The modification of location of the energy radiation alternatively may vary over the symbol duration with at least one occurrence during the symbol duration of an instantaneous speed greater than a quarter of the ratio of the smallest wavelength of the waves in the medium divided by the symbol duration. The method further includes acceleration of the modification of location to modify the velocity over the symbol duration, to thereby generate encoded space-time warped signals defining spatially dependent bandwidth. In a particular mode of this method, the step of modifying the location of the energy radiation comprises the step of synthetically modifying the location.

A method according to another aspect of the invention is for signaling using symbols. The method comprises the step of generating symbols of selected duration and of bandwidth larger than the inverse of the symbol duration, and having normalized information entropy within the range of zero to one, and the information encoded into at least one of phase and amplitude. The energy is radiated in waves from a location. The waves have amplitudes related to the at least one of the symbol amplitude and phase. Over time, the location of the energy radiation is modified to follow along a coded path in space, resulting in apparent asymmetric time warping of the radiated energy in waves. The time warping is dependent on direction in space. The modification of location of the energy radiation varies over the symbol duration with at least one occurrence during the symbol duration of a instantaneous speed greater than C/200, and with coded acceleration of the modification of location to modify the velocity over the symbol duration, to thereby generate encoded space-time warped signals defining spatially dependent bandwidth. The method also includes the step of receiving, at a second location, a subset of the encoded space-time warped signals, to thereby generate received encoded space-time warped signals. The subset represents a portion of the transmitted encoded space-time warped signals available at the second location. The received encoded space time warped signals are processed to extract the information content. The step of modifying the location of the energy radiation may comprise the step of synthetically modifying the location. The step of processing encoded space-time warped signals may comprise the steps of determining the space time warping decoder for the received space time encoded warped signals, and dewarping the received encoded space time warped signals using the space time warping decoder so determined. The step of determining the space time warping decoder may comprise the steps of correlating the received encoded space time warped signals with a plurality of the encoded space time warped signals to thereby generate a correlator output signals, and one of selecting and combining the correlator output signals. The correlating with a plurality of the encoded space time warped signals may include correlating with time-delayed replicas. The method may include the steps of one of selecting and combining the correlator output signals to produce selected/combined signals, and measuring at least one of the amplitude and phase of the selected/combined signals to determine the information content.

The step of determining the space time warping decoder may be performed in the presence of unwanted space time signal, in which case the method comprises the steps of selecting from among the replicas one which is to be rejected, and correlating the received encoded space time warped signals with an encoded space time warped signal which is orthogonal to the one of the replicas to be rejected to thereby generate correlator output signals. A correction may be applied to the result of the correlation to recover the original amplitude and phase of the received encoded space time warped signal.

The step of dewarping may include the steps of sampling the received encoded space time warped signals with a bandwidth greater than the bandwidth of the space time warped symbol to be dewarped, applying or performing a non-linear time resampling of the received space time warped signals, and measuring at least one of the amplitude and phase of the correlator output signals to determine the information content.

DESCRIPTION OF THE INVENTION

According to an aspect of the invention, a space\time code can be applied to a transduced (transmitted or received) electromagnetic signal through either real or synthetic motion of the antenna which does the transducing. The space/time coding results in a transduced signal that is different in each spatial direction. This may be viewed as a decorrelation of the signal relative to spatial angle, and this decorrelation can be exploited for sensing, communications, and navigation applications. In the context of a sensing system, the decorrelation of signals from different spatial directions can be used to reduce the effects of clutter and multipath. This characteristic can be used in sensor systems to provide ubiquitous (omnipresent as a function of spatial angle) illumination, while maintaining directivity at a single receiver. In the context of a communications system, the effects of fading may be ameliorated as multipath effects are diminished. In a navigation system, the angular location of the receiver can be determined relative to the orientation of the transmitter array using a single omnidirectional receiver together with space/time encoded transmissions. This invention involves time-varying processes that occur when real or synthetic motion exists between a transmitter/receiver in communications or between a target & sensor/transmitter for sensing, or in corresponding navigation applications.

Figure 1:
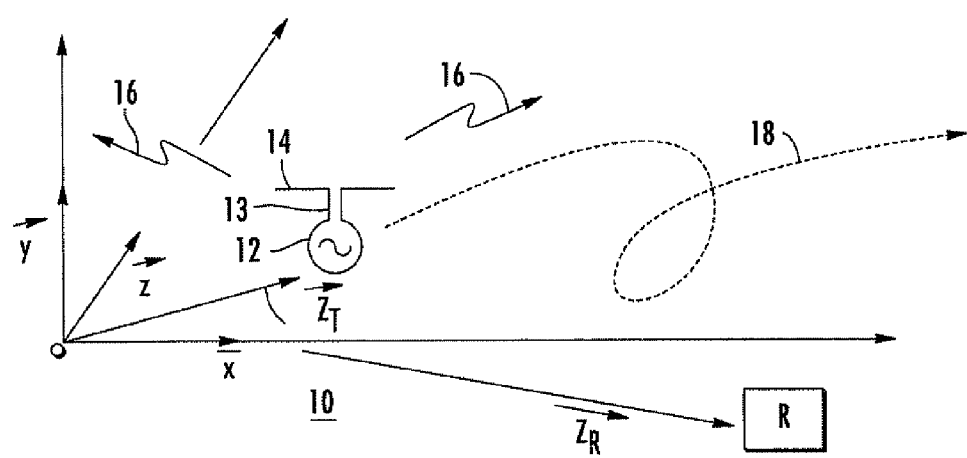
FIG. 1 is a simplified illustration of an electromagnetic transmitter operating in a vacuum medium and transmitting electromagnetic signal while the transmitter is in motion along a predetermined path.

FIG. 1 illustrates an arrangement 10 including a source 12 of electrical signal at a frequency or over a band of frequencies, which may be encoded with pulses or symbols of predetermined duration. The electrical signal from source 12 is coupled over a guided-wave path 13, illustrated as a two-wire line, to an antenna designated 14. Those skilled in the art know that antennas are transducers of electromagnetic energy, which convert between unguided "free-space" or "far-field" electromagnetic energy and constrained or "guided" waves on some form of transmission line. Antennas are understood to be reciprocal devices, which have the same gain and radiation pattern characteristics in both transmission and reception modes of operation. At least the antenna 14 of FIG. 1 is in motion along a predetermined path designated as 18, which is illustrated as being three-dimensional. The source 12 may also be in motion. Thus, at least antenna 14, and possibly source 12, move or moves so as to successively occupy different locations along path 18. As antenna 14 moves, it radiates electromagnetic energy, the instantaneous flow of which is illustrated by arrows designated 16. It is assumed for purposes of this invention that antenna 14 may have omnidirectional response, or an approximation thereof. "Omnidirectional" antennas having broad bandwidth are known. One example is the equiangular conical spiral antenna.

Those skilled in the art will recognize that the motion of the antenna 14 in FIG. 1 along path 18 causes direction-dependent frequency modulation or "Doppler effect" of the electromagnetic signal, as described by Baghdady in U.S. Pat. No. 4,060,809 and in E. J. Baghdady, "Theory of frequency modulation by synthetic antenna motion", IEEE Trans. In Comms., Vol. 39, No. 2, (1991). As described by Baghdady, the motion of the antenna may be actual or simulated. The Baghdady arrangement is used for tracking and position determination. In general, the apparent frequency of the electromagnetic energy transmitted from the arrangement 10 of FIG. 1 will increase in directions parallel to a component of the forward motion (that is, when the antenna 14 approaches), and decrease in directions parallel to a component of reverse or retrograde motion (antenna 14 receding).

Figure 2:
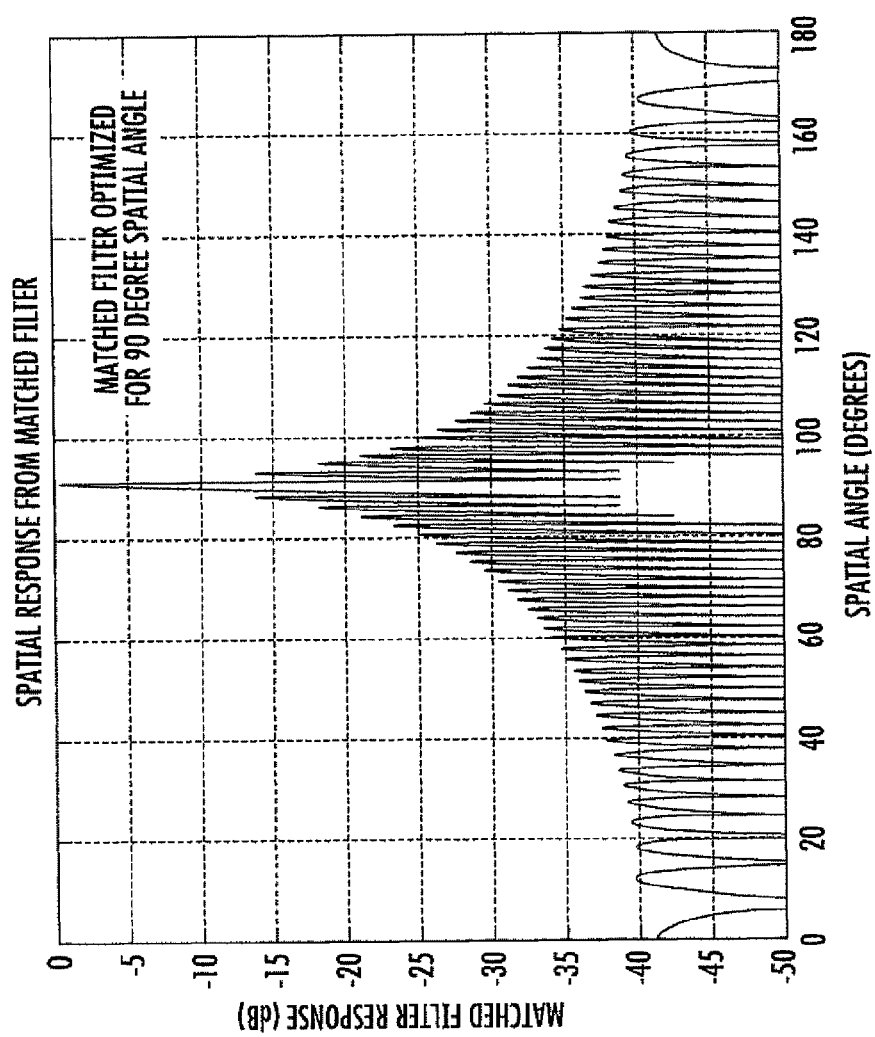
FIG. 2 is a plot of spatial response of a single channel matched filter for the case of a single moving transmitter.

In a sensor system according to an aspect of the invention, a space/time code is applied to the transmitted signal. A different signal is simultaneously transmitted in every direction due to the space/time coding. The return signal can be processed with a matched filter optimized for a given spatial direction. The output of the matched filter has a response that is dependent upon the target's spatial direction relative to the direction for which the matched filter is optimized, thus providing directionality at the receiver. FIG. 2 is a plot of the spatial response from a matched filter optimized for a 90° spatial angle in response to a transmitted continuous-wave (CW) pulsed waveform or signal on which space/time coding has been applied in the form of motion of the transmitter linearly with constant velocity. The plot of FIG. 2 shows that the output response of a matched filter optimized for a specific angular direction has an angular response which is equivalent to the traditional angular response of a line antenna array. It should be noted that this response is achieved by continuous motion of a single transmitter during the transmission of a single pulse and by reception of the pulse so transmitted at a single stationary element.

Figure 3A:
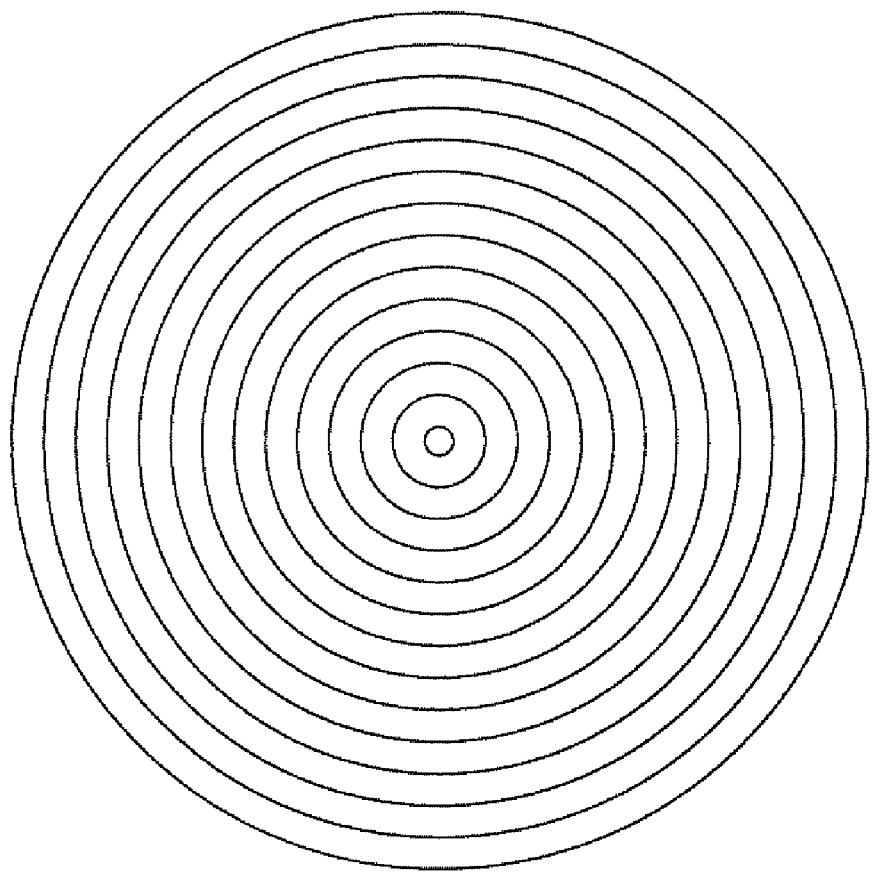
FIG. 3A represents the phase error present as a function of azimuth angle around a transmitter which is immobile at the center of the system.
Figure 3B:
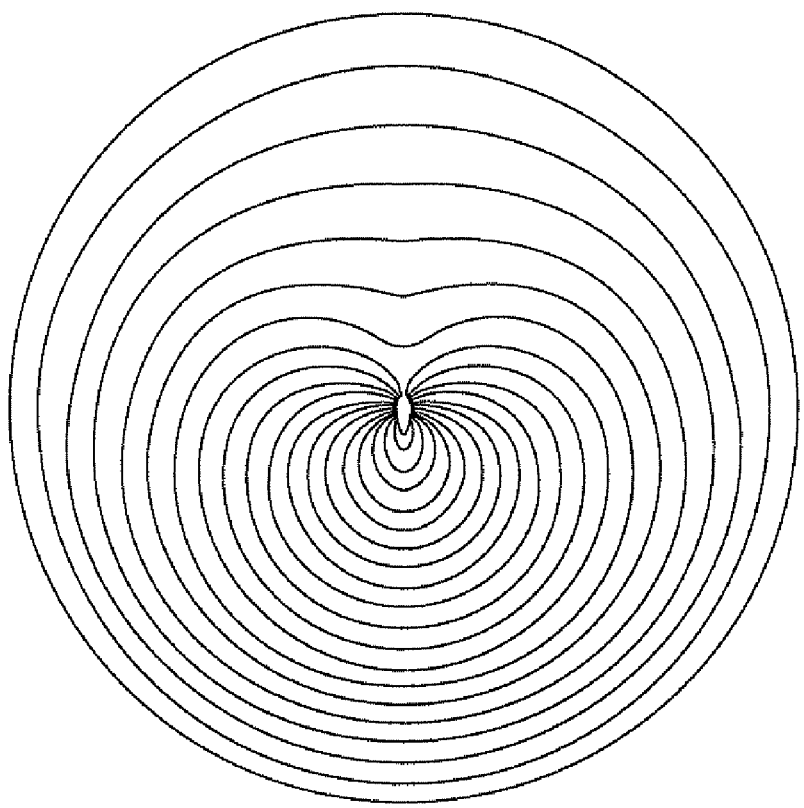
FIG. 3B represents the phase error as a function of angle around a transmitter which moves at constant speed in a given direction on a plane.
Figure 3C:
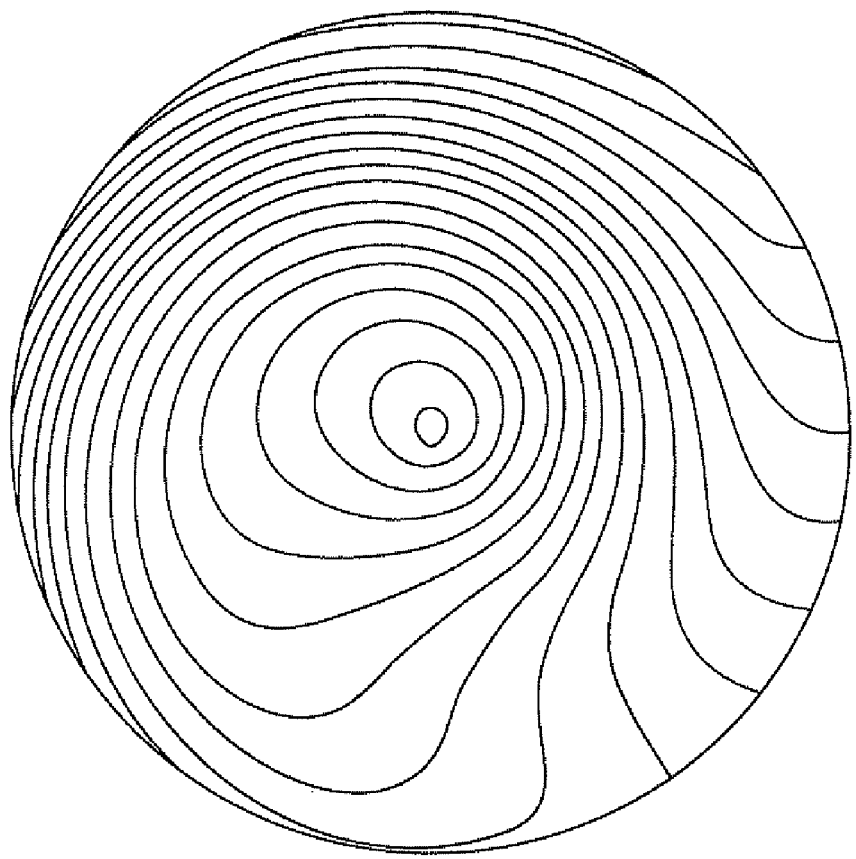
FIG. 3C illustrates the phase error as a function of azimuth angle around a transmitter moving along a planar spiral path around the center of the system.
Figure 3D:
FIG. 3D illustrates the phase error as a function of azimuth angle of a transmitter moving along a planar doubly-interconnected spiral path]

FIG. 3A is a representation of phase as a function of azimuth angle around an electromagnetic transmitter operating at a fixed frequency, where the transmitter is immobile at the center of the system. In FIG. 3A, the spaced-apart circles represent circles of constant phase or constant phase contour. An observer or viewer located at any azimuth angle sees the phase of the electromagnetic energy flow past his position with constant intervals between equal-phase conditions, representing constant frequency. FIG. 3B represents a transmitter such as that of FIG. 3A, where the transmitter is moving with constant speed in a downward direction (toward the bottom of the FIGURE). An observer located at the bottom of the plot or system of FIG. 3B finds that the phase change occurs more rapidly than in the arrangement of FIG. 3A, corresponding to a higher apparent transmitted frequency, resulting from Doppler frequency shift. Contrariwise, an observer at the top of the system of FIG. 3B, at a location from which the transmitter is receding, perceives a lower frequency, with corresponding increased temporal spacing between equiphase conditions of the received electromagnetic wave. To an observer at the right and left of the system of FIG. 3B, the frequency is midway between that for an observer at the top and the bottom of the FIGURE, and should approximate the frequency perceived in the arrangement of FIG. 3A. The transmitter motion represented in FIG. 3C is a planar spiral motion. The planar spiral motion results in a situation in which the transmitter approaches the observer during some portions of the spiral path, and recedes from the observer during other portions. The effect of this motion is to cause the observer to perceive alternating higher and lower frequencies, represented in FIG. 3C by closely-spaced and widely-spaced equiphase contour lines. Thus, if one imagines the electromagnetic signal produced at the center of the system flowing along a straight free-space path to the right from the center of FIG. 3C, it will be clear that closely spaced phase contours will alternate with widely spaced phase contours, thereby alternately presenting an apparent frequency increase followed by an apparent frequency decrease. The representation of FIG. 3D is that which would occur as a result of transmitter motion along a spiral path, including multiple spiral turns.

Figure 4A:
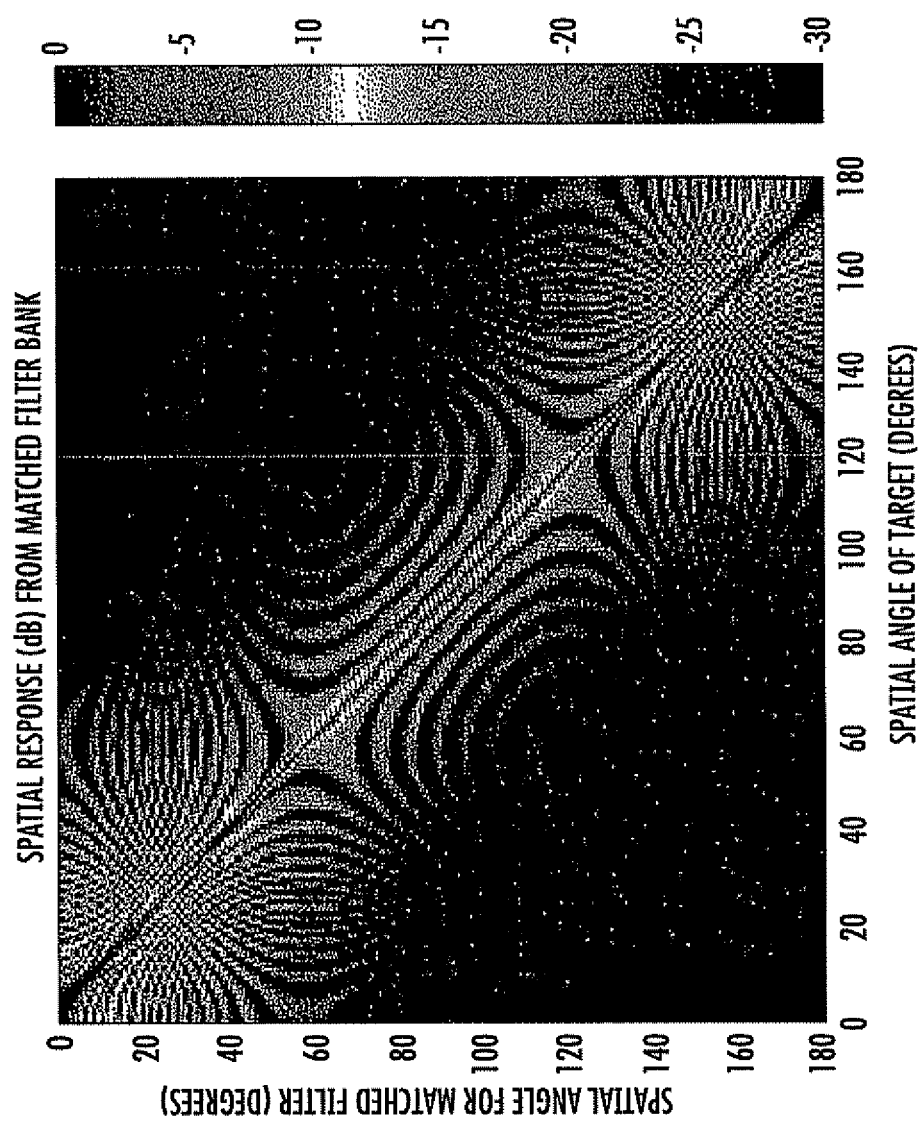
FIG. 4A represents the spatial response from a bank of spatial filters over the range of 0° to 180°.
Figure 4B:
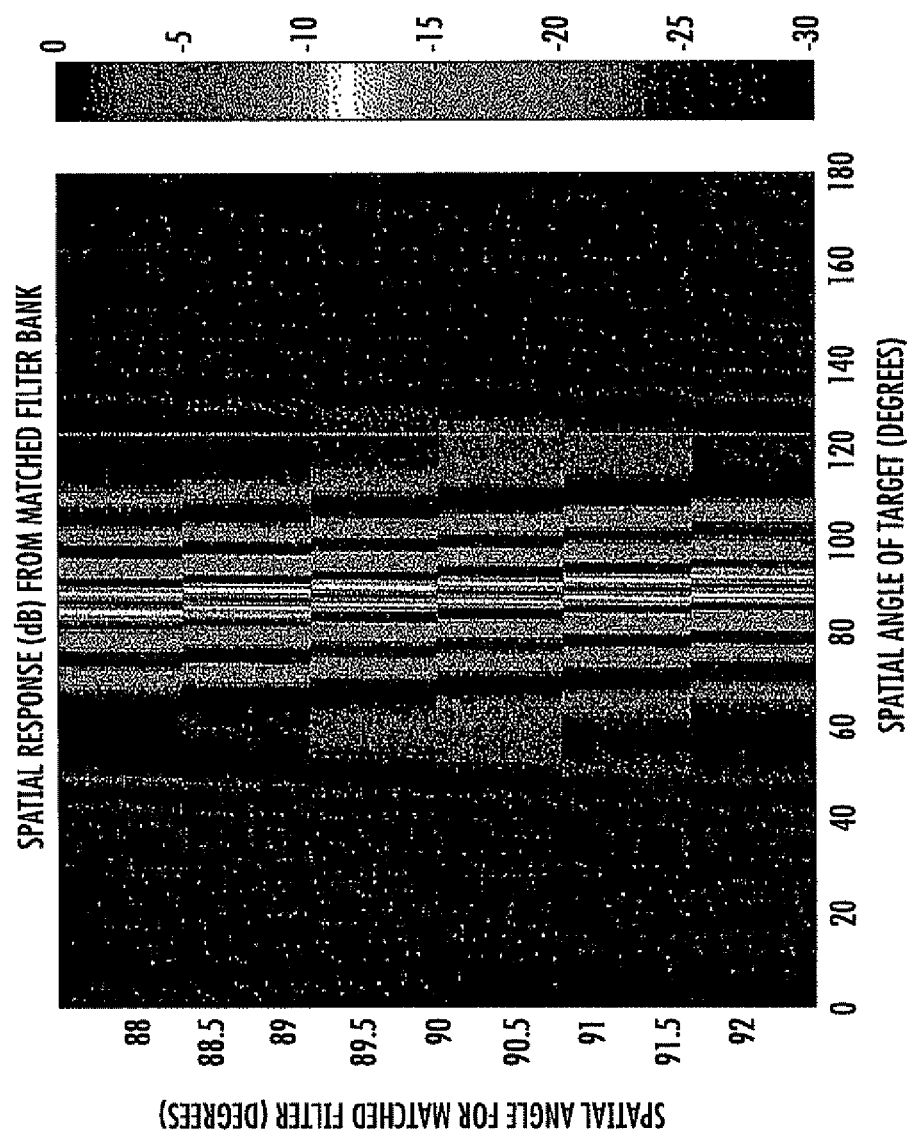
FIG. 4B represents the same response in the region around 90°.

Multiple matched filters (a bank of matched filters) can be used within the sensor receiver such that each filter is optimized for a different spatial direction. FIGS. 4A and 4B together represent the spatial response from a bank of filters matched to various different spatial angles, where the driving space/time code applied to the transmitted signal is motion of the transmitter location linearly with constant velocity and using a pulsed-CW waveform. This driving function corresponds to the one used in conjunction with FIG. 2. The X-axis in FIGS. 4A and 4B represents the location of a potential target, while the Y-axis represents the spatial angle that the particular filter is matched to. The spatial response illustrated in FIGS. 4A and 4B is the peak response of the filters. In general, the matched filter bank of FIGS. 4A and 4B has significant response over most target spatial angles, with the exception of the diagonal portion of the plot extending from the 0° matched filter to the 180° target angle. Thus, a sensor system can be made ubiquitous, or almost so, by applying a space/time code to the transmitted waveform. Other sensor system properties such as clutter cancellation (Doppler Resolution) and sidelobe levels can be optimized by selection of the space/time coding of the transmitted waveform. More particularly, the space/time coding can be adjusted by changing characteristics of the motion, signal modulation, and array configuration of the transmitter. It should particularly be noted that the same properties can be obtained by maintaining a stationary transmitter, with space/time coding of the motion of the receiver.

The capability of simultaneously transmitting a different signal in every direction (simultaneously in all directions) may be termed "ubiquitous illumination." Ubiquitous illumination can be exploited in a communication system. One common problem with communication systems is that of multipath reception, which can result in fading. This problem is due to the simultaneous or almost-simultaneous reception of the transmitted signal by way of different communication paths, known as direct and multipaths. This nearly simultaneous reception of the same signal results in constructive and destructive interference which tends to degrade the overall reception. The performance of current communication systems can be enhanced by increasing the power of the transmitted signal and by the use of receivers which tend to equalize the signal channels or paths. Both of these techniques are expensive. In the context of a communication system, a space/time code can be applied to the transmitted signal such that a different waveform is transmitted in each direction. Thus, the composite signal at the receiver is a combination of a series of varying signals. The effects of fading are reduced, as a matched filter optimized for the direct path can used in the receiver, thereby tending to reduce the adverse effects of multipath signals arriving from different spatial directions.

In the context of a navigation system, the capability to simultaneously transmit a different signal in every direction by applying a space/time code to the transmitted signal allows a receiver to determine its angular location relative to the transmitter by using a series of matched filters optimized for different spatial directions. The angular direction to the transmitter can be determined from the angle associated with the matched filter giving the greatest response. The instantaneous location of the transmitter can be embedded within the transmitted signal, so the transmitter location is known, and the angle from the receiver is known, thereby establishing a known line of bearing. The use of plural transmitters allows generation of plural intersecting lines, as in triangulation. In addition, the location of a receiver can be determined from a single transmitter if the transmitter location and bearing are embedded in the transmission and the receiver is time-synchronized with the transmitter.

Analysis of the invention begins with a definition of a three-dimensional coordinate system with an origin O and orthonormal vectors $(\vec{x}, \vec{y}, \vec{z})$, as illustrated in FIG. 1. Consider a transmitter 12 whose location from origin o is defined by the vector $\vec{Z}_T$. We also define a receiver (R) 20 placed at an observation point $Z_R$ located at vector $\vec{Z}_R$ from the origin. The velocity of the waves in the medium is defined by c. Consider now a signaling waveform defined by a function s(t) with respect to time. Assume that a time-dependent code is agreed upon between the transmitter 12 and receiver 20 which defines the variation of the locus of the transmitter along path 18 of FIG. 1 during the transmission of the signaling waveform s(t). The space/time code results in a time-varying location of the transmitter defined by the time-varying function vector:

$$\vec{Z}_T(t) = x_T(t) \cdot \vec{x} + y_T(t) \cdot \vec{y} + z_T(t) \cdot \vec{z} \quad (1)$$

The observed signal at the receiver location depends on a time-varying delay:

$$\tau(t, \vec{Z}_R) = \frac{|\vec{Z}_R - \vec{Z}_T(t)|}{c} \qquad (2)$$

which creates a unique coded time warping of the signaling waveform at the observing receiver. This function is encoded in both space and time and varies with receiver location and over time. The observed or apparent time $t_a$ at the receiver can be expressed relative to the reference time of the transmitter and that relationship is given by:

$$t_a = t - \tau(t, \vec{Z}_R) = f(t, \vec{Z}_R) \qquad (3)$$

To express the signaling waveforms under time-warping as seen at the observer we use the original signaling function s(t) and we first express the reference time t with respect to the apparent time $t_a$ and invert the time-warp code function $f(t, \vec{Z}_R)$ using:

$$t = f^{-1}(t_a, \vec{Z}_R) \qquad (4)$$

Where we fix the receiver location treated as a parameter. We need to express this mapping function from apparent time to absolute time at the transmitter because the signaling function is known and defined with respect to the reference time t at the transmitter. As a result we can now express the time-warped signal $\tilde{s}$ seen at the receiver at location $\vec{Z}_R$ with:

$$\tilde{s}(t_a, \vec{Z}_R) = s(f^{-1}(t_a, \vec{Z}_R)) \qquad (5)$$

Figure 5A:
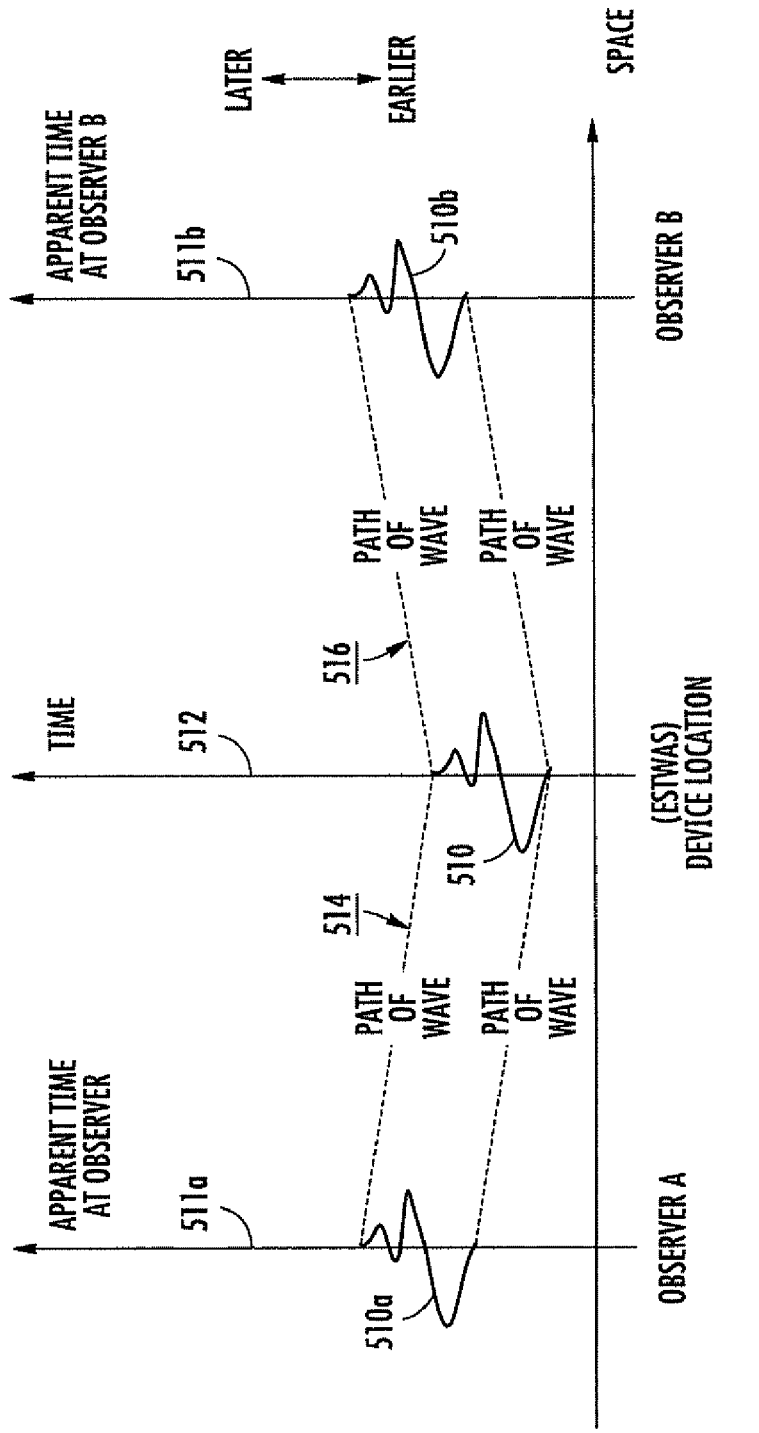
FIG. 5A illustrates normal energy propagation in which the transmitter does not move relative to the receiver during the time of transmission.

To represent this mapping of the time-warp signaling we introduce the Space-Time diagram seen in FIG. 5A. FIG. 5A represents or plots device location (transmitter location) as a function of "actual" time. The transmitted signal waveform 510 is not subject to motion during the transmission, as can be seen by noting that the time baseline 512 for the device has no x-axis component. The transmitted signal moves through space to the left and to the right along paths 514 and 516 in FIG. 5A toward observer or receiver positions A and B. At times later (in an upward direction in FIG. 5A) than the time of transmission, the transmitted wave arrives at locations A and B. The arrival waveform at location A is illustrated as 510a, and the waveform arriving at location B is illustrated as 510b. In FIG. 5A the transmitter location is not varied and the signaling waveform 510 is illustrated by a line over the time scale. The path of the wave is then mapped for two receiver or observer locations A and B. The conditions of FIG. 5A are "normal" conditions in which there is no relative motion, and consequently no "time warping" occurs. The lack of time warping in FIG. 5A is shown by the congruence of transmitted waveform 510 with received waveforms 510a and S1ob.

Figure 5B:
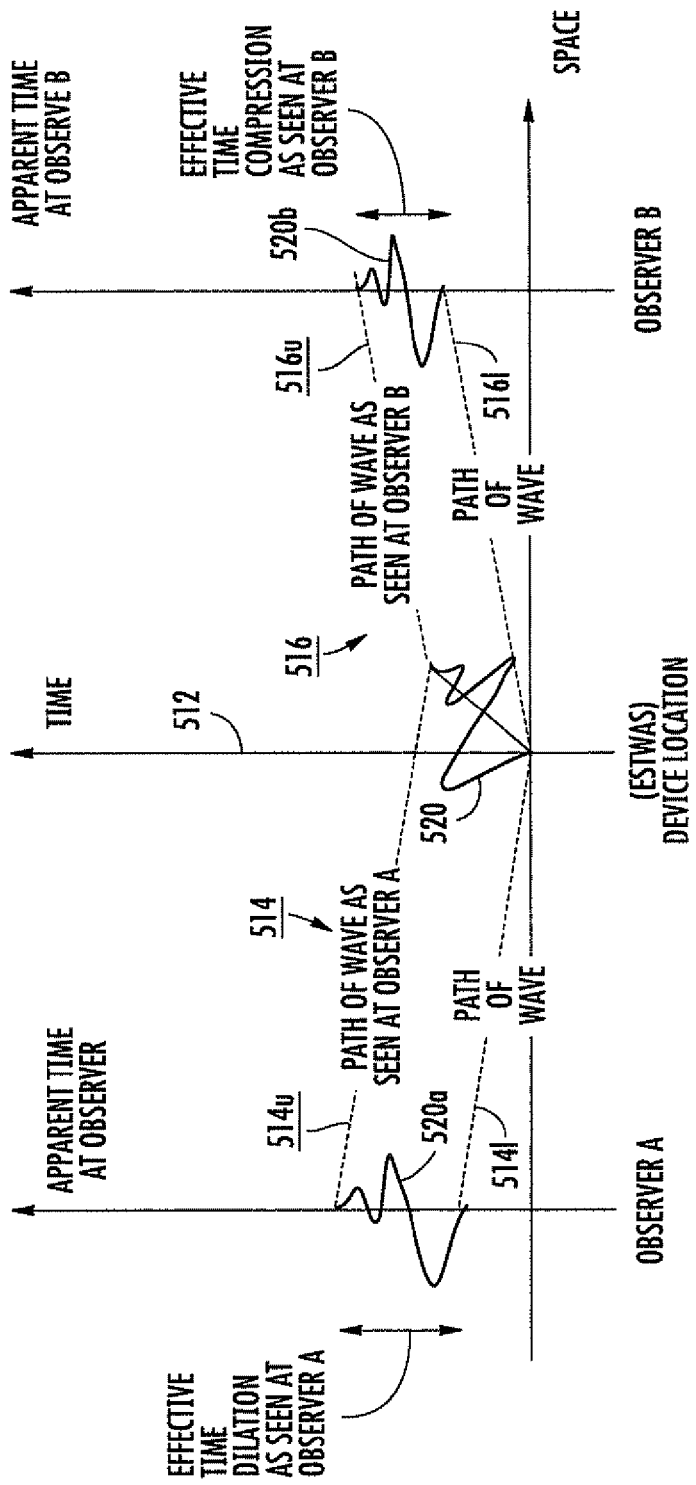
FIG. 5B illustrates the effect of uniform linear motion of the transmitter during the transmission time, showing how time dilation and compression occurs.

FIG. 5B is similar to FIG. 5A, but differs in that the transmitted waveform 520 takes place during a transmission time in which linear motion of the transmitter takes place relative to the locations of receivers or observers A and B. In FIG. 5B, the motion of the transmitter is toward observer B, as can be verified by noting that the progress of the transmitted waveform 520 proceeds to the right, which is toward location B and away from location A. Consequently, the length of the path 516 between the transmitter location and receiver B is greater at the beginning of the transmission of waveform 520 than it is at the end of the transmission of the waveform. That is to say, the length of lower path 516l is greater than the length of upper path 516u. Consequently, the latter (upper) portion of waveform 520 tends to arrive earlier at location B than it would in the absence of motion of the transmitter. This has the effect of apparent or effective time-compression of received waveform 520b relative to the time characteristic of the transmitted waveform 520. Similarly, in FIG. 5B, the motion of the transmitter is away from observer A, as can be verified by noting that the progress of the waveform 520 proceeds to the right as it being transmitted, which is away from location A. Consequently, the length of the path 516 between the transmitter location and receiver A is lesser at the beginning of the transmission of waveform 520 than it is at the end of the transmission of the waveform. That is to say, the length of lower path 514l is less than the length of upper path 514u. Consequently, the latter (upper) portion of waveform 520 tends to arrive later at location A than it would in the absence of motion of the transmitter. This has the effect of apparent or effective time-dilation of received waveform 520a relative to the time characteristic of the transmitted waveform 520.

In general, FIGS. 5a and 5b show the concept of time-warping for time compression or dilation of the signalling waveform in the case of simple linear motion where range to an observer changes linearly with time. Clearly, the time-varying time of flight of the signaling waveform result in a time compression of the waveform in the direction of Observer B as the relative motion reduces the distance from the transmitter to the observer. One the other hand a time dilation is experienced at Observer A as the relative motion increases the distance from transmitter to observer over the course of the waveform.

Figure 6:
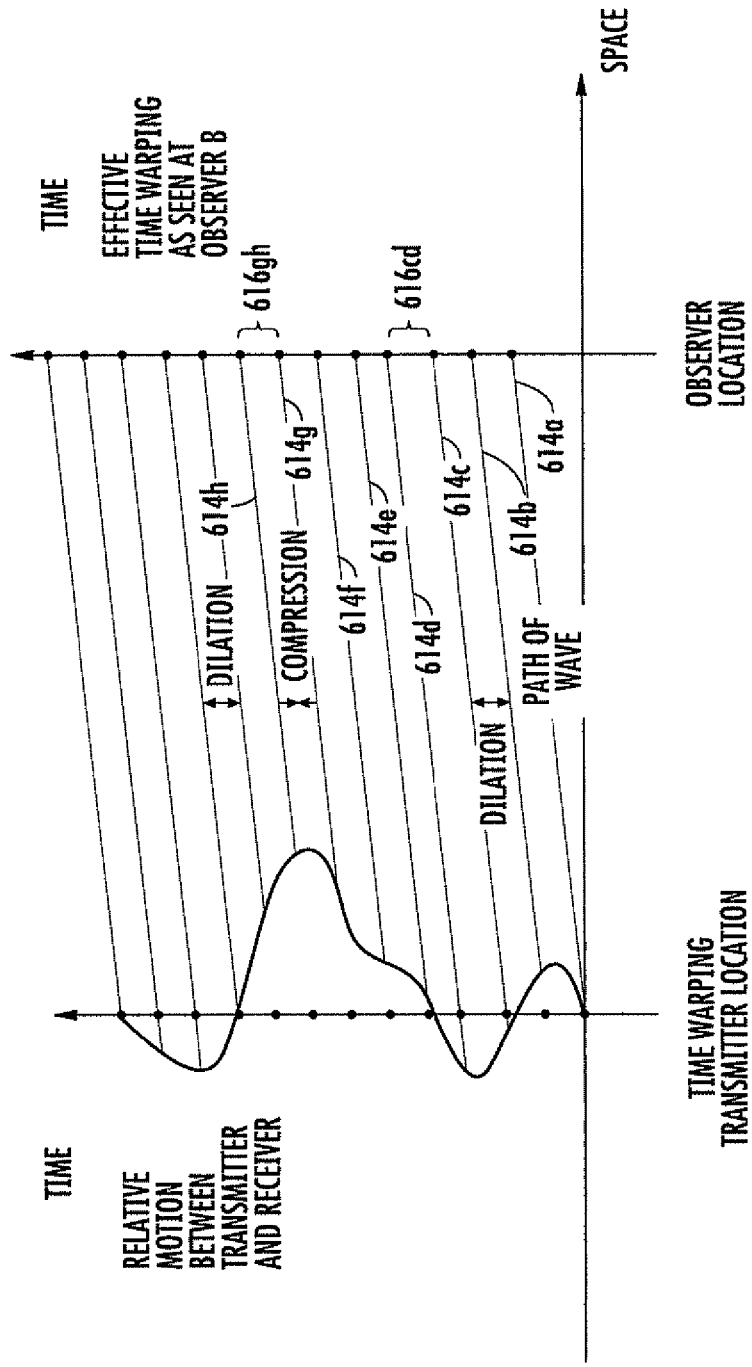
FIG. 6 illustrates a more complex space/time encoding than FIG. 5A or 5B, in that nonlinear relative motion or transformation is applied to the signalling waveform to create both time dilation and compression of the received signal.

FIG. 6 illustrates the more complex case in which non-linear relative motion leads to a space-time warping function used for encoding the data. In FIG. 6 the paths of the wave are shown in the space/time plot with small broken arrows for reference sampled times on the transmitter location axis. The apparent time warping function for each of these uniform samples appears distorted at the observer where the time-warping function maps the time with the expected compressions and dilations due to the relative motion. The time compressions and dilations are represented in FIG. 6 by the non-parallel relationship of the projection or path lines 614a, 614b, 614c, 614d, 614f, 614g, and 614h. Thus, the transmitter time when represented at the receiving site or observer location includes time intervals such as $616_{cd}$ which are relatively dilated and other time intervals such as $616_{gh}$ which are compressed. The relative motion can be defined to be spatially dependent using asymmetric motions with respect to the coordinate system. As a result observers in various locations experience a different time warping function.

Figure 7A:
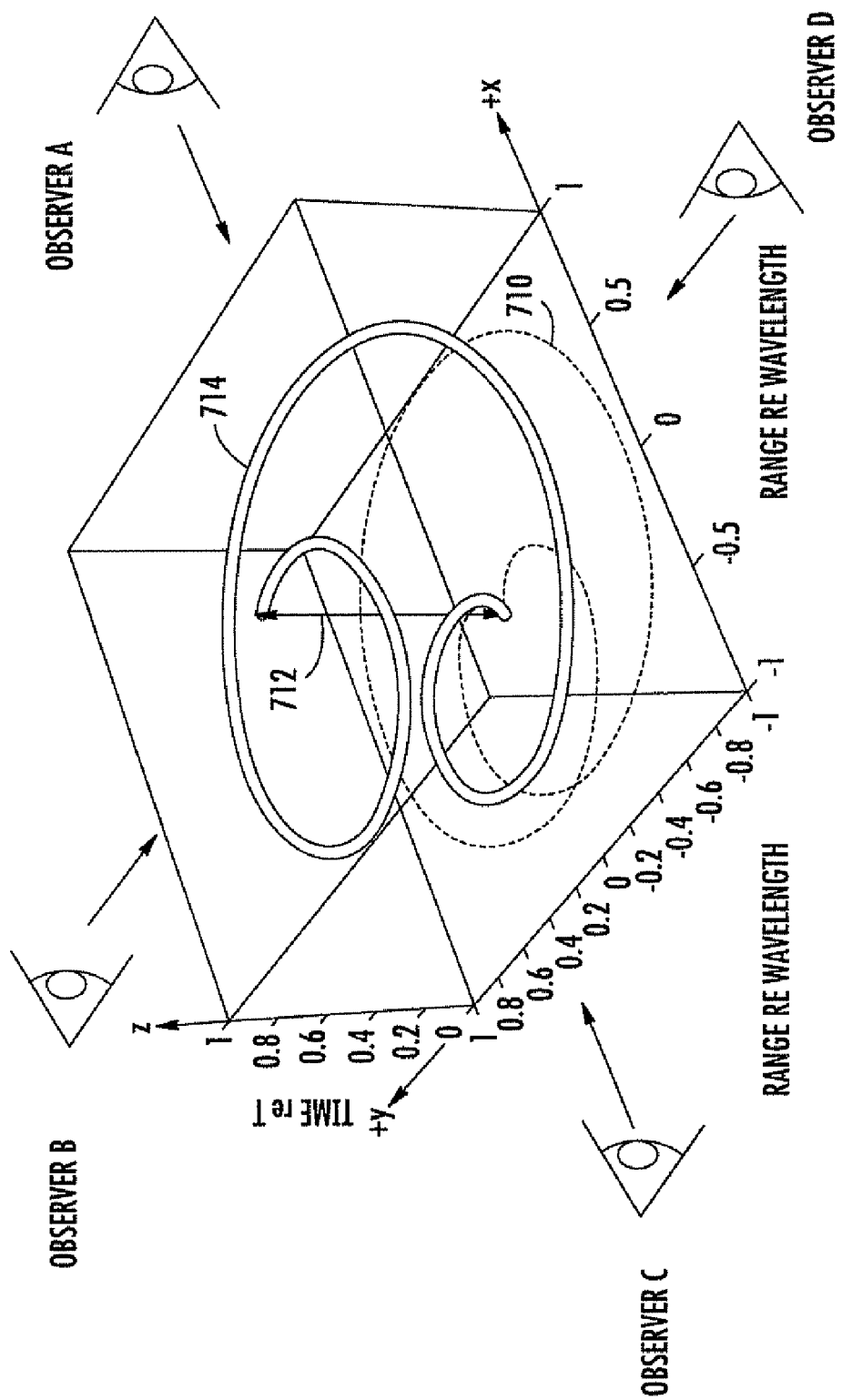
FIG. 7A illustrates a nonlinear asymmetrical three-dimensional time-warping function viewed as a function of time, and defining various angles about the radiating element.
Figure 7C:
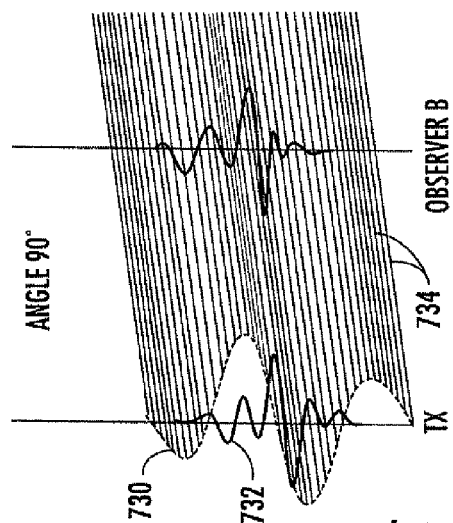
FIGS. 7B, 7C, 7D, and 7E represent the space-time warping as seen at four locations about the function of FIG. 7A.
Figure 7E:
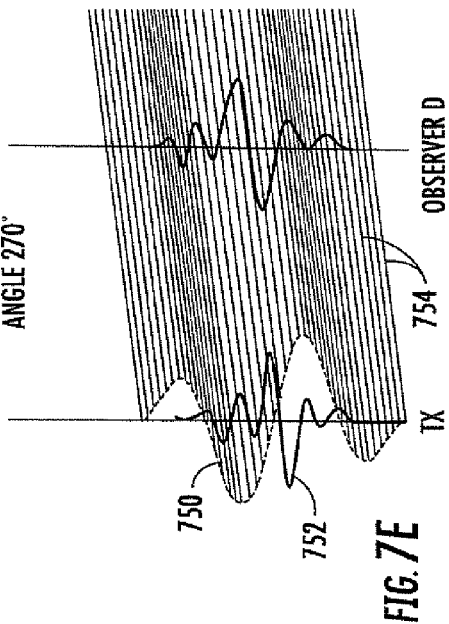
Figure 7B:
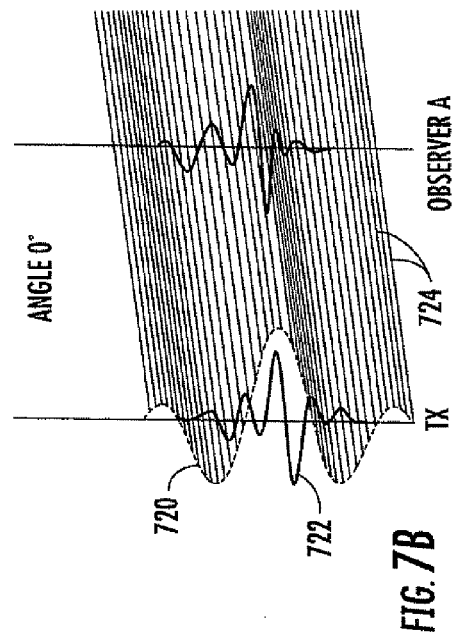
Figure 7D:
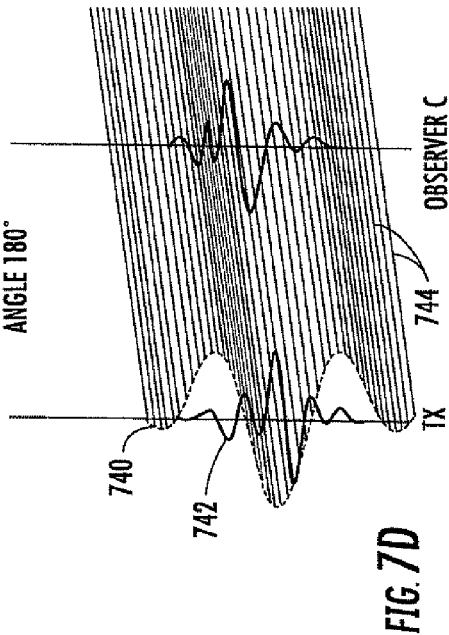

To further illustrate this concept, consider first the an asymmetrical space time warping device operating in a two-dimensional (2D) space and following a 2D motion in the (X,Y) plane. In this case, FIG. 7B shows by dash-line 710 the transmitter's location in the (X,Y) plane as a function of time chosen at equi-sampled points in time. Time is represented in FIG. 7B by the arrow 712 orthogonal to the X,Y plane. Time in FIG. 7B is normalized to the signaling waveform duration T and the x and y axes are normalized to the signaling waveform wavelength. As the X,Y plane moves in time, the location of the transmitter follows three-dimensional path 714. The space-time warping code obtained with this space-time encoder is generic and used solely for the purpose of illustrating the concept. The dash-line 710 lying in the X-Y plane represents the actual motion taken by the transmitter over time in the two-dimensional (2-D) X-Y plane. The Z-axis represents time.

Figure 8:
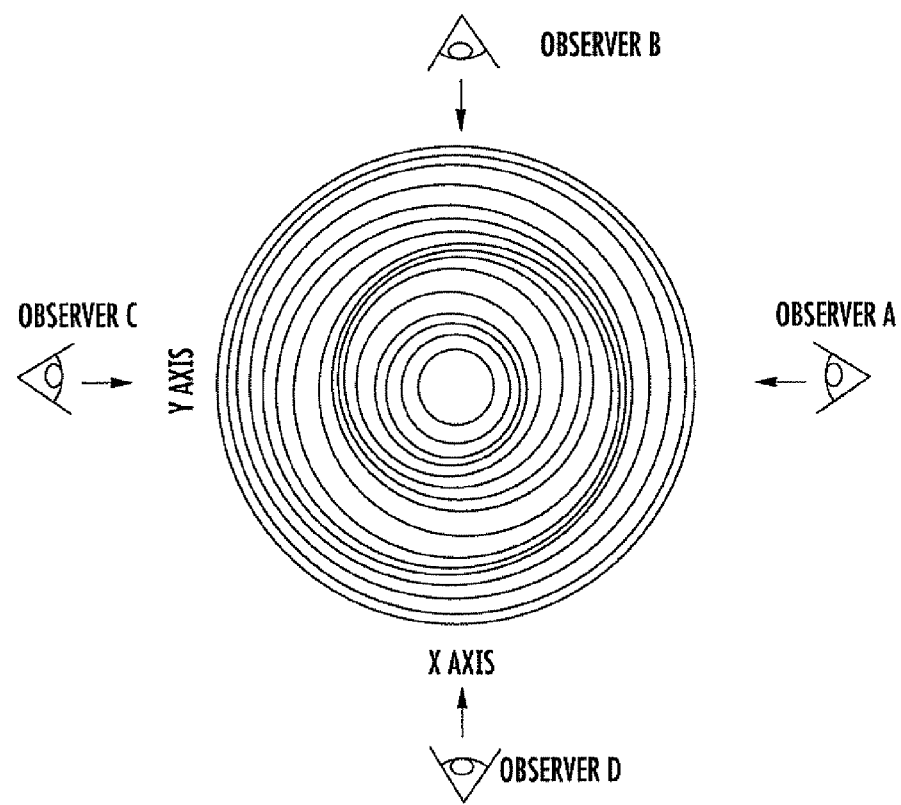
FIG. 8 represents the wave front of an ubiquitous space-time warp encoded signalling waveform as a function of angle about the transmitting location(s) and also as a function of range or time of propagation.

The relative motion represented in FIG. 7B creates a 2D space-time warp code that is seen differently at various receivers' location around the transmitter. FIGS. 7b, 7c, 7d, and 7e show the different time warping function for this motion as seen from four non-collocated observers A, B, C, and D at angles of 0°, 90°, 180°, and 270°, respectively, about the transmitter. In FIGS. 7b, 7c, 7d, and 7e the space-time warping is illustrated on the left or transmitter (TX) side by dash lines 720, 730, 740, and 750, respectively, and the transmitted signalling waveform is illustrated by solid lines 722, 732, 742, and 752, respectively. As in FIG. 6, the propagation in space and time of the transmitted signal is illustrated in FIGS. 7b, 7c, 7d, and 7e by the parallel, approximately-horizontal lines 724, 734, 744, and 754, respectively. The resulting time-warped received signal arriving or received at the various observers are illustrated at the right of FIGS. 7b, 7c, 7d, and 7e, by solid lines 726, 736, 746, and 756, respectively. The encoded time warping function is manifested or seen in the compression and dilations imposed onto the signaling waveforms at each of the observer directions. One can display the amplitude variations over space for all 360 degrees around the transmitter. In the case of interest the relative motion is encoded and because this code varies with the location of the observer it appears as though different signaling waveforms are transmitted ubiquitously from the transmitter area. Hence, the transmission is encoded in space-time and ubiquitous. FIG. 8 shows a top view of the wavefront of or for the ubiquitous space-time warp encoded signaling waveform seen in FIGS. 7a, 7b, 7c, 7d, and 7e, as a function of angles and range representing time of propagation. The compression and dilation of the transmitted waveform as a function of spatial angle can be seen by the varying wavefront in FIG. 8.

FIGS. 7a, 7b, 7c, 7d, 7e, and 8 together illustrate the dependency of the time-warp code with respect to the observer location and introduce the concept that time-warp signaling provides simultaneously directionality and ubiquity of transmission. The directionality is derived from the decorrelation properties of the signaling waveforms at different directions of departure. If the observer has knowledge of the space-time warping transformation, compensation can be applied using either a match to the warped function or a dewarping function that is dependent on the direction of departure prior to matching to the signaling waveform. The observer can use a set of dewarping function to estimate the best match to the dominant signaling waveform in their direction.

Figure 9:
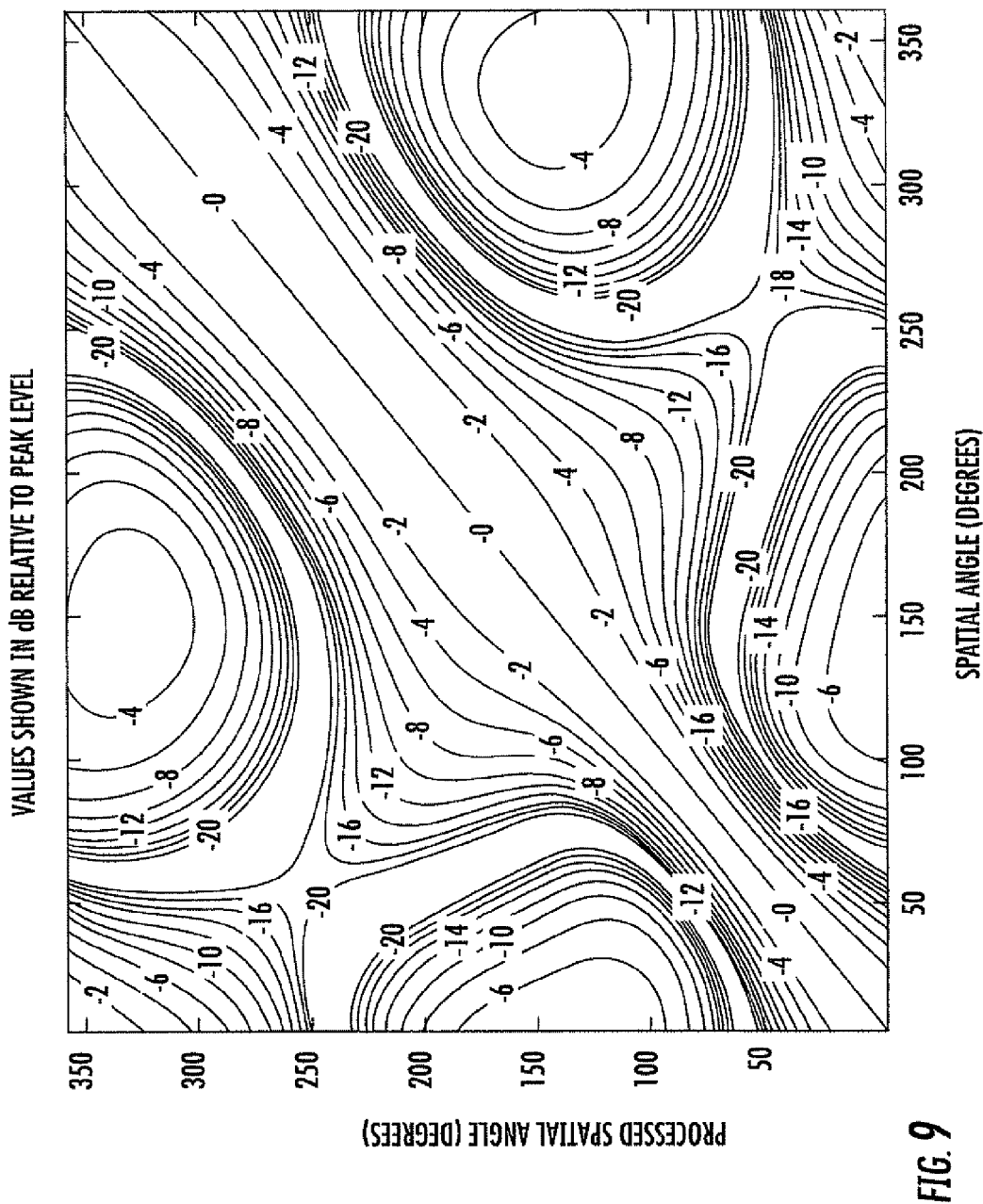
FIG. 9 represents cross-correlation properties in space-space plane of the space-time codes at each 1 degree angle, illustrating the concept of directivity on receive from the space-time encoded ubiquitous illumination.

FIG. 9 shows an example of the cross-correlation properties of these codes to illustrate the gain in directivity obtained at the receiver from the ubiquitous energy emanating from the receiver. Thus, FIG. 9 represents the spatial response from a bank of filters matched to the various different spatial angles, where the driving space/time code applied to the transmitted signal is the motion of the transmitter depicted in FIG. 7. The indicated values in FIG. 9 are in dB relative to the peak level.

The correlation functions seen in FIG. 9 are given by:

$$R_{\theta_i,\theta_j} = \int_{-\infty}^{\infty} \tilde{s}(t_a, \vec{Z}_{\theta_i}) \cdot \tilde{s}^*(t_a, \vec{Z}_{\theta_j}) dt_a = \qquad (6)$$

$$\int_{-\infty}^{\infty} s(f^{-1}(t_a, \vec{Z}_{\theta_i})) \cdot s^*(f^{-1}(t_a, \vec{Z}_{\theta_j})) dt_a$$

where $$\vec{Z}_{\theta_j} = r(\cos(\theta_i)\vec{x} + \sin(\theta_i)\vec{y}) \qquad (7)$$

and r is the range of the observer to the origin. This case shows the correlation operator using the time-warp codes. However, one could transform the received space-time warped signals back into the original signaling waveform in a dewarping process that is spatially dependent, and then process the correlation to the known signaling waveform and obtain the same correlation levels across the space-space plane. As a result, in the case of simple line-of-sight operations, an observer can determine its location with respect to the transmitter's path by correlating to the best space-time warp code. Also the codes can be used for gain against multipaths in a communication system by locking onto the best path. Deep fading that occurs from the destructive interference of correlated multipaths is naturally eliminated because the various multipaths are now naturally decorrelated through the space-time warping process.

In other words, the receiver benefits from the directivity of the aperture (the path) traced by the transmitter motion while the transmission remains ubiquitous, and therefore no losses attributable to directional transmissions occur when the beam pattern is not directly pointed towards the observer of interest. The space-time warping code enables directivity on receive with maximum gain regardless of the observer location and motion while the transmission is in process. The space-time warping approach enables the receiver to process its own directivity and track himself with respect to transmitter apparent aperture, thereby eliminating the losses associated with beam mismatch such as is often seen in directional communications in dynamic and mobile networks. The decorrelation properties of the space-time warping codes can therefore be used to encode a variety of signaling waveforms used for sensing or communicating.

Figure 11A:
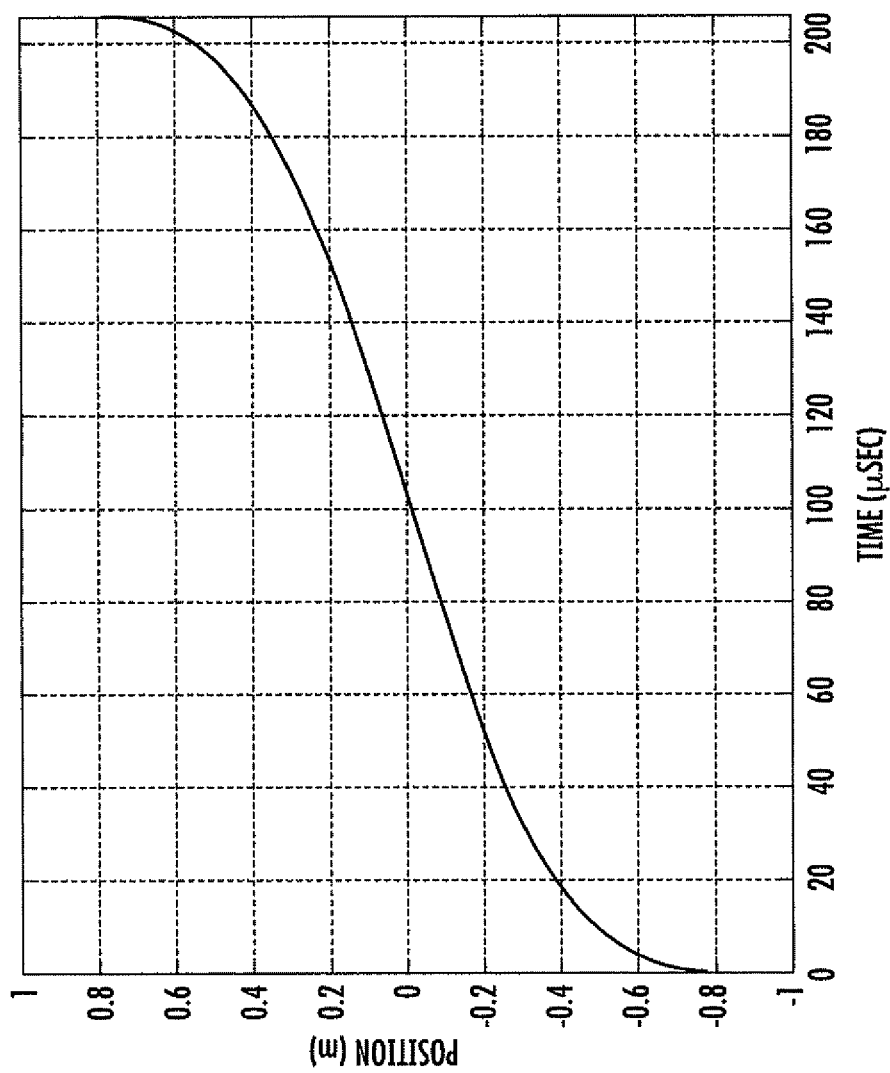
FIG. 11A represents the path of a single transmitter in motion with non-constant speed while transmitting.
Figure 11B:
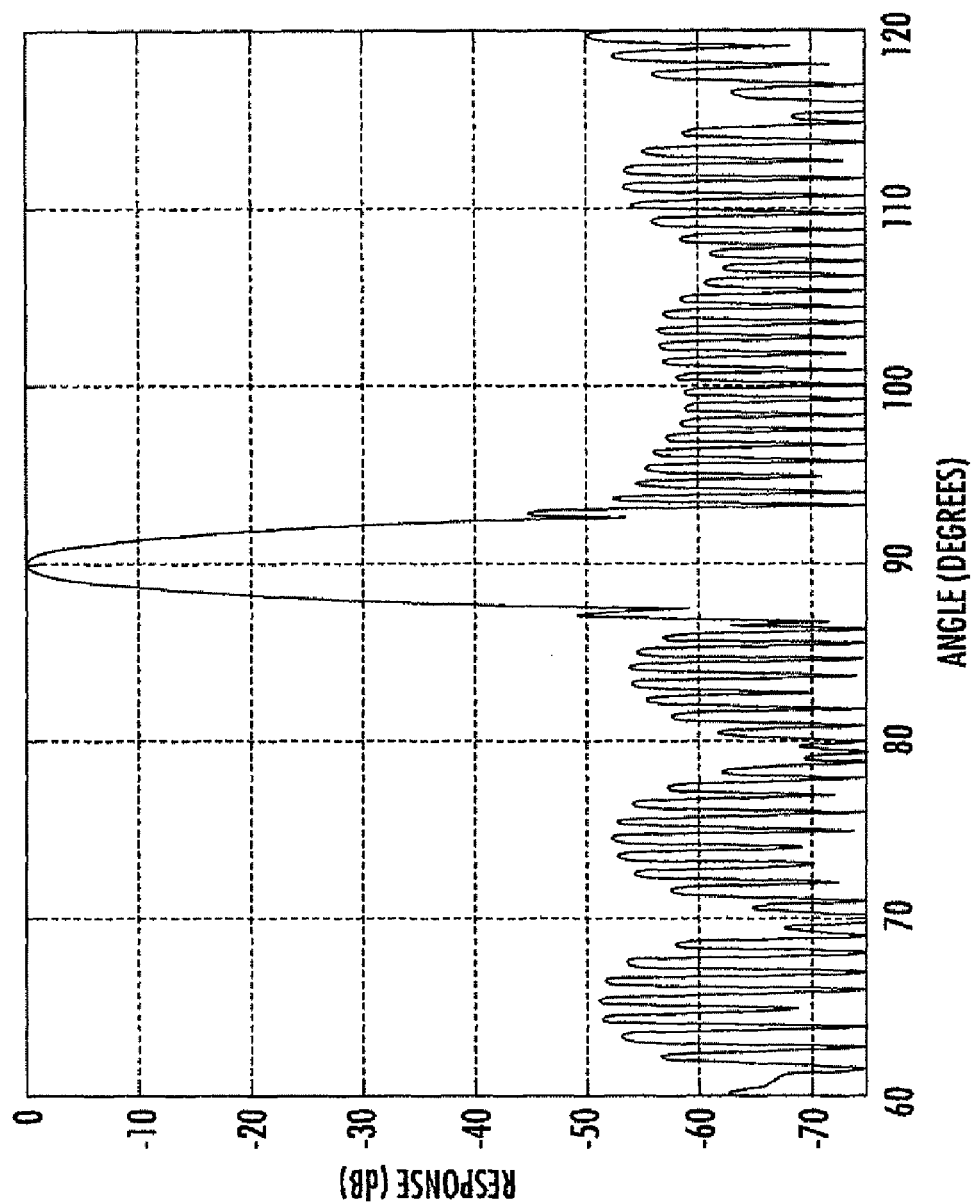
FIG. 11B is a plot of spatial response of a single channel matched filter for the case of a single moving transmitter with the non-constant speed.

It should also be noted that the acceleration of the transmitter along the coded path can be used to control the sidelobes of the beam pattern on receive by applying a "spatial weighting function" across the "aperture" described by the transmitter along the coded path. That is, if the transmitter is assumed for simplicity to be in uniform motion in a particular direction during transmission of a pulse, the line so defined subtends an "aperture" from which the transmitted signal may be viewed as emanating. The amount of energy transmitted from each portion of this "aperture" is the same, since the motion is uniform and the transmitted amplitude is constant. This will result in a spatial response similar to that suggested by FIG. 2. It is possible by adjusting the energy distribution across the transmitting "aperture" by changing the "speed" of motion across the aperture. As an example, FIG. 11A shows the path of motion of a single transmitter or antenna in which the transmitter travels a linear path with varying speed. The ordinate is graduated in units of position in FIG. 11A, and the abscissa is graduated in time. The speed can be seen to increase at the right and left of the plot by noting the slope of the plot relative to the slope at the center of the plot. If the speed is greater at the beginning and at the end of the motion of the transmitter across the aperture, the energy distribution across the aperture will be such as to reduce the sidelobe level of the spatial response. It should be noted that the spatial response of the matched filter of the receiver may be adjusted to match the spatial motion of the transmitter for optimum performance. FIG. 11B represents a plot of the spatial response in dB, versus angle, of a single channel matched filter for the case of a single moving transmitter traveling the path depicted in FIG. 11A. Note that the spatial response in the sidelobe region of the matched filter response is greater than 50 dB lower than the peak response of the matched filter. This sidelobe level is in contrast with the much higher sidelobe levels shown in FIG. 2 in which the transmitter moves in a linear path with constant speed.

Several possible implementations of space-time warp signaling exist. In a first embodiment, the signal can be transmitted from a single transmitter whose actual location is dynamically changed during the signaling waveform duration, as described in conjunction with FIG. 10A. In a second embodiment, the signaling waveform is multiplexed over the time of a signaling waveform or symbol based on a coded multiplexing sequence over a series of transmitters at known locations along a geometrical arrangement or synthetic "path," as represented in FIG. 10B. In this arrangement, the signaling waveform or symbol is present on (or transmitted from) only one transmitter at a time. In a third embodiment represented by FIG. 10C, a set of coded short-duration time windows are used for amplitude-weighting the signaling waveforms that is or are transmitted simultaneously over a series of transmitters at known locations along a geometrical arrangement. In this latter implementation the signaling waveform is piped to all transmitters simultaneously but the weighting functions are encoded so that the energy of the signaling waveform or symbol is spatially focused but dynamically shifted across the arrangement at all time during the duration of the transmission so as to create a virtual motion or virtual multiplexing over the transmitters used in the arrangement.

Figure 10A:
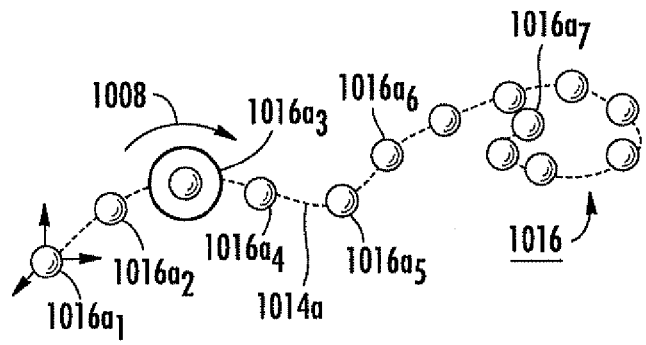
FIG. 10A represents the path of a single transmitter in motion along a path while transmitting.
Figure 10B:
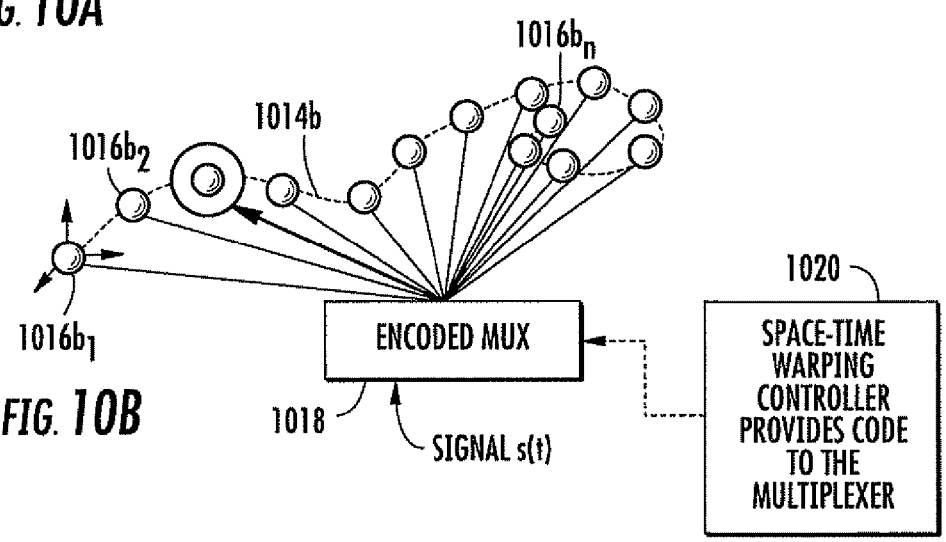
FIG. 10B represents a multiplexed embodiment in which a plurality of transmitters each occupy a fixed location, and the signal is multiplexed one-at-a-time to the various transmitters by a single channel modulated by the space-time code.

In FIG. 10A, the transmitter proceeds in actual motion in the direction of arrow 1008 along a curvilinear path 1014a, from time to time taking on positions indicated by the various circles $1016a_1$, $1016a_2$, ..., $1016a_4$, $1016a_5$, $1016a_6$, ..., $1016a_N$ of a set 1016 of circles. The current location of the transmitter is illustrated by a large circle $1016a_3$. The moving transmitter transmits a signal s(t) during the motion.

FIG. 10B illustrates a similar curvilinear path 1014b with various fixed transmitter locations $1016b_1$, $1016b_2$, ... $1016b_N$. The signal s(t) is applied to a multiplexer block 1018, which includes a plurality of switches controllable for switching the signal s(t) one-at-a-time to any one of the transmitter locations. The signals are multiplexed one-at-a-time to the transmitter locations based on a space-time warping code from a space-time warping controller 1020. The paths extending from the multiplexer block to the various transmitters are assumed to have equal lengths, or the space-time warping controller compensates for the known path lengths to the transmitters. Such compensation is known in the art, and involves adjusting the time of the switching command(s) to the multiplexer block 1018 to cause the signals to arrive at the transmitter locations at the desired times.

Figure 10C:
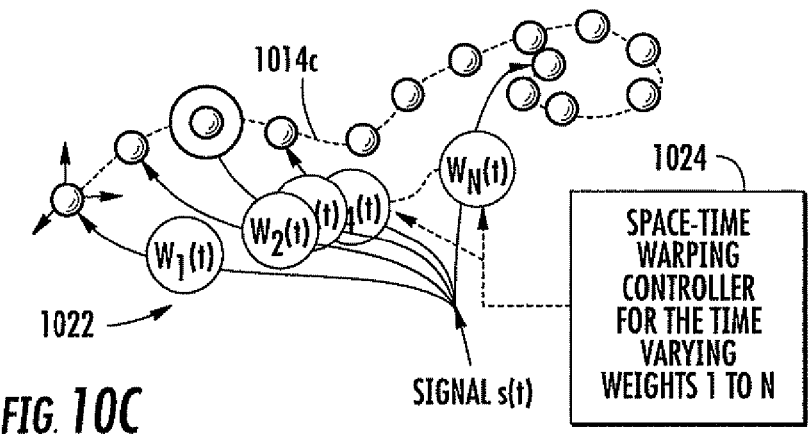
FIG. 10C represents a plurality of transmitters each occupying a fixed location as in FIG. 10B, but in which each transmitter receives signal modulated by a weighting function, which may simultaneously be nonzero for a plurality of the transmitters.

In FIG. 10C, the curvilinear path 1014c is again similar to those of FIGS. 10a and 10b. The transmitter locations are fixed, as in FIG. 10B. The difference between the arrangement of FIG. 10C and that of FIG. 10B is that in FIG. 10B, the fixed transmitters at their various locations transmit simultaneously, though possibly with varied gain. The same signal s(t) is applied in common to a set 1022 of controlled modulators or gain elements $W_1(t)$, $W_2(t)$, ..., $W_N(t)$. The gain of the set 1022 of controlled modulators or gain elements is controlled by a space-time warping controller illustrated as a block 1024.

In communication applications, to benefit from the coding gain, the space-time warping code is applied to the signaling waveform (or symbol) so that the time-warp code is an inner code of an iterative coding technique. From the spatially dependent time warping transformation the resulting signals are both directional and spread in a method that jointly combines space and time coding. Some related technologies include direct sequence spread spectrum and beamforming/antenna technologies used for gaining directionality.

The concept of spreading using an inner-symbol code akin to the inner symbol spread of Direct-Sequence-Spread-Spectrum (DSSS) codes and the maximum bandwidth expansion is due to the maximum apparent velocity. A difference between time warping and DSSS is that the time warped signal is directional while ubiquitous. In contrast, a DSSS signaling using isotropic or directive antennas tends to preserve the correlation level of the DSSS code in all directions. In other words, the DSSS code is not dependent on the direction of electromagnetic energy departure. As a result, the multipaths energy still correlate at various time delays and the risk of deep flat fading is present when destructive multipaths occur within a chip duration. In addition, the spreading code of DSSS is structured and can be detected based on high order statistics processing, whereas the time warp code does not necessarily have inner structure, as the inner-symbol transmitter motion can be varied to remove any type of cyclo-stationary and/or structure of time and frequency.

Another difference some methods of time warp communications and a basic beamformer with antenna is that even though a beamformer is based on a spatial aperture for gaining directionality, the inner-symbol code in a beamformer is jointly encoded over space and time and as a result, the directionality of the apparent aperture is gained on receive (concept of directivity on receive) as opposed to on transmit. The directionality of the apparent aperture is gained on receive upon matching the warping function upon appropriate dewarping of the received signal(s). In traditional beamformers/antennae (time delayed, phase shifted or physical antenna aperture) the directionality pattern is unique to each transmission and the illumination is not ubiquitous. Time warp signaling in some modes provides the means to be ubiquitous and preserve the directionality on receive that is proportional to the apparent aperture.

The time-warp code in some modes is applied within a symbol, and as a result, is different from the traditional spatial diversity or capacity-maximizing space-time codes that are used in Multiple-Input Multiple-Output (MIMO) systems. This intra-symbol encoding transforms the signaling waveform, resulting in bandwidth expansions akin to DSSS, while encoding the waveform spatially is akin to SDMA. The single output implementation of time-warp communication differs from traditional space-time trellis ($STTC^i$) and space-time block codes ($STBC^{ii}$) in that space time mechanisms generate N transmit waveforms to be sent simultaneously on N transmitters. The $STTC^i$ is described in Tarokh et al, "Space-time codes for high data rate wireless communications: Performance criterion and code construction", Trans. IEEE Information Theory, VOL. 44, NO. 2, March 1998, and the $STBC^{11}$ is described in Tarokh et al, "Space-time block coding for wireless communications: performance results", IEEE Journal on Selected Areas in Communications 17 (3): 451:460. In contrast, in time warp communications the signaling waveform is sent on a single transmitter at a time. For this purpose, the controlled modulators of FIG. 10C force single-transmitter-at-a-time operation. Another difference is that in block codes the spatial code updates across the aperture. In these cases the aperture is used mainly for spatial redundancy and or diversity, and directionality is an indirect product of the matching to the code and the data.

Another difference between time warp signaling and traditional space time coding is that the code in STTC is dependent on the data stream which makes the decoding complicated and often requires the use of a Viterbi decoder. Also, the directionality offered by the aperture is only gained on receive for STTC when both code and data stream are successfully decoded, on the other hand, the time-warp function is not related to the data stream content and therefore directionality gain on receive. STTC is not trivial to use for multi-streaming and usually block codes and multi-stream oriented MIMO algorithms. Time warp encoding can support multi-stream using the natural decorrelation of the encoded multiple paths.

The encoded space time warp signaling technique(s) described herein is(are) akin to Baghdady's Induced Directional Frequency Modulation[1] but different in the sense that the warping is computed and compensated for all, or at least substantially all, Fourier components of the signaling waveform. It is also different because it provides an exact solution of the time warping of signals in the time domain and can therefore be applied to any wideband signaling waveforms and does rely on a frequency modulation or specific carrier. The method for encoded space-time warp signaling presented here is not limited nor based on the use of carrier waves.

What is claimed is:

1. A method for signaling using symbols, said method comprising the steps of:
   generating symbols of selected duration, of bandwidth larger than an inverse of the symbol duration and normalized information entropy within a range of zero to one and with the information encoded into at least one of phase and amplitude;
   radiating energy in waves from a location with an antenna, which waves have amplitudes related to said at least one of said phase and amplitude;
   over time, modifying said location of said energy radiation along a coded path in space by moving the antenna at an instantaneous speed greater than $\frac{1}{200}^{th}$ of the wave propagation speed, C, (C/200) within a medium, wherein the medium is a vacuum and the speed C is the speed of light in the vacuum, resulting in apparent asymmetric time warping of said radiated energy in waves, which time warping is dependent on direction in space, said modification of location of said energy radiation varying over the symbol duration with at least one occurrence during said symbol duration of said instantaneous speed greater than C/200, and with coded acceleration of said source of said energy of said modification of location to modify the speed over the symbol duration, to generate encoded space-time warped signals defining spatially dependent bandwidth;
   receiving with a receiver at a second location a subset of said encoded space-time warped signals, to generate received encoded space-time warped signals; and
   processing said received encoded space-time warped signals to extract the information content,
   wherein said step of processing said received encoded space-time warped signals comprises the steps of:
      determining a space-time warping decoder for said received space-time encoded warped signals; and
      dewarping said received encoded space-time warped signals using said space-time warping decoder.

2. The method according to claim 1, wherein said step of modifying said location of said energy radiation comprises the step of synthetically modifying said location.

3. The method according to claim 1, wherein said step of determining the space-time warping decoder comprises the steps of:
   correlating said received encoded space-time warped signals with a plurality of said encoded space-time warped signals to thereby generate correlator output signals; and
   selecting or combining said correlator output signals.

4. The method according to claim 1, wherein said step of determining the space-time warping decoder comprises the steps of:
   correlating said received encoded space-time warped signals with a plurality of said encoded space-time warped signals, some of which signals include time delayed replicas, to thereby generate correlator output signals;
   selecting or combining the correlator output signals to produce selected/combined signals; and
   measuring at least one of amplitude and phase of said correlator output signals to determine the information content.

5. The method according to claim 1, wherein said step of determining the space-time warping decoder is performed in the presence of unwanted space time signals, and comprises the steps of:
   selecting from among replicas, one of which is to be rejected;
   correlating said received encoded space-time warped signals with an encoded space-time warped signal which is orthogonal to said one of said replicas to be rejected to thereby generate correlator output signals;
   applying a correction to a result of said correlation to recover original amplitude and phase of said received encoded space-time warped signal.

6. The method according to claim 5, further comprising the steps of:
   selecting and combining the correlator output signals; and
   measuring at least one of amplitude and phase of said correlator output signals to determine the information content.

7. The method according to claim 1, wherein said step of dewarping includes the steps of:
   sampling said received encoded space time-warped signals with a bandwidth greater than a bandwidth of said space-time warped symbol to be dewarped;
   applying a non-linear time resampling of said received space-time warped signals; and
   measuring at least one of amplitude and phase of said correlator output signals to determine the information content.

8. The method for signaling using symbols, said method comprising the steps of:
   generating symbols of selected duration and of bandwidth larger than an inverse of the symbol duration and normalized information entropy within a range of zero to one and the information encoded into at least one of phase and amplitude;
   radiating energy in waves from a location with an antenna, which waves have amplitudes related to said at least one of said symbol amplitude and phase;
   over time, modifying said location of said energy radiation along a coded path in space by moving the antenna at an instantaneous speed greater than a quarter of the ratio of the smallest wavelength of said waves divided by the symbol duration, resulting in apparent asymmetric time warping of the radiated energy in waves, which time warping is dependent on direction in space, said modification of location of said energy radiation varying over the symbol duration with at least one occurrence during said symbol duration of said instantaneous speed greater than said quarter of the ratio of the smallest wavelength of said waves divided by the symbol duration, and with coded acceleration of said source of said energy of said modification of location to modify the speed over the symbol duration, to thereby generate encoded space-time warped signals defining spatially dependent bandwidth;
   receiving with a receiver at a second location a subset of said encoded space-time warped signals, to thereby generate received encoded space-time warped signals; and
   processing said received encoded space-time warped signals to extract the information content,
   wherein said step of processing encoded space-time warped signals comprises the steps of:

determining a space-time warping decoder for said received space-time encoded warped signals; and dewarping said received encoded space-time warped signals using said space-time warping decoder.

9. The method according to claim 8, wherein said step of modifying said location of said energy radiation comprises the step of synthetically modifying said location.

10. The method according to claim 8, wherein said step of determining the space-time warping decoder comprises the steps of:

correlating said received encoded space-time warped signals with a plurality of said encoded space-time warped signals to thereby generate a correlator output signals; and one of selecting and combining the correlator output signals.

11. The method according to claim 8, wherein said step of determining the space time warping decoder comprises the steps of:

correlating said received encoded space time warped signals with a plurality of said encoded space time warped signals, some of which may be time delayed replicas, to thereby generate a correlator output signals; and selecting or combining the correlator output signals to produce selected/combined signals;

measuring at least one of amplitude and phase of said correlator output signals to determine the information content.

12. The method according to claim 8, wherein said step of determining the space-time warping decoder is performed in the presence of unwanted space-time signals, and comprises the steps of:

selecting from among said time delayed replicas one which is to be rejected;

correlating said received encoded space-time warped signals with an encoded space-time warped signal which is orthogonal to said one of said replicas to be rejected to generate correlator output signals;

applying a correction to the result of said correlation to recover the original amplitude and phase of said received encoded space-time warped signal.

13. The method according to claim 12, further comprising the steps of:

selecting and combining the correlator output signals; and measuring at least one of the amplitude and phase of said correlator output signals to determine the information content.

14. The method according to claim 8, wherein said step of dewarping includes the steps of:

sampling said received encoded space-time warped signals with a bandwidth greater than the bandwidth of said space time warped symbol to be dewarped;

applying a non-linear time resampling of said received space-time warped signals; and measuring at least one of the amplitude and phase of said correlator output signals to determine the information content.

15. A system for signaling using symbols, said system comprising:

a transmitter for generating symbols of selected duration and of bandwidth larger than an inverse of the symbol duration and normalized information entropy within a range of zero to one and the information encoded into at least one of phase and amplitude;

a space-time warping controller for, over time, modifying a location of waves of radiating energy having amplitudes related to said at least one of said phase and amplitude, along a coded path in space caused by moving a source of said energy at an instantaneous speed greater than a quarter of the ratio of the smallest wavelength of said waves divided by the symbol duration, resulting in apparent asymmetric time warping of the radiated energy in waves, which time warping is dependent on direction in space, said modification of location of said energy radiation varying over the symbol duration with at least one occurrence during said symbol duration of said instantaneous speed greater than said quarter of the ratio of the smallest wavelength of said waves divided by the symbol duration, and with coded acceleration of said source of said energy of said modification of location to modify the speed over the symbol duration, to generate encoded space-time warped signals defining spatially dependent bandwidth; and a receiver for processing a subset of received encoded space-time warped signals to extract the information content, wherein said step of processing encoded space-time warped signals comprises the steps of:

determining a space-time warping decoder for said received space-time encoded warped signals; and dewarping said received encoded space-time warped signals using said space-time warping decoder.

16. The system according to claim 15, wherein said step of modifying said location of said energy radiation comprises the step of synthetically modifying said location.

17. The system according to claim 15, wherein said step of determining the space-time warping decoder comprises the steps of:

correlating said received encoded space-time warped signals with a plurality of said encoded space-time warped signals to thereby generate a correlator output signals; and selecting or combining the correlator output signals.

18. The system according to claim 15, wherein said step of determining the space-time warping decoder comprises the steps of:

correlating said received encoded space-time warped signals with a plurality of said encoded space-time warped signals, some of which signals include time delayed replicas, to generate a correlator output signals; and selecting or combining the correlator output signals to produce selected/combined signals;

measuring at least one of amplitude and phase of said correlator output signals to determine the information content.

19. The system according to claim 15, wherein said step of determining the space-time warping decoder is performed in the presence of unwanted space-time signals, and comprises the steps of:

selecting from among said replicas one of which is to be rejected;

correlating said received encoded space-time warped signals with an encoded space-time warped signal which is orthogonal to said one of said replicas to be rejected to thereby generate a correlator output signals;

applying a correction to a result of said correlation to recover original amplitude and phase of said received encoded space-time warped signal.

20. The system according to claim 19, wherein the processor executes instructions for performing the further steps of:
   selecting and combining the correlator output signals; and
   measuring at least one of amplitude and phase of said correlator output signals to determine the information content.

21. The system according to claim 15, wherein said step of dewarping includes the steps of:
   sampling said received encoded space-time warped signals with a bandwidth greater than the bandwidth of said space-time warped symbol to be dewarped;
   applying a non-linear time resampling of said received space-time warped signals; and
   measuring at least one of amplitude and phase of said correlator output signals to determine the information content.

* * * * *